(12) United States Patent
Machida

(10) Patent No.: US 7,164,509 B2
(45) Date of Patent: Jan. 16, 2007

(54) IMAGE READER HAVING IMAGE SENSOR ICS DIVIDED INTO PLURAL BLOCKS HAVING SIMULTANEOUSLY READ-OUT IMAGE SIGNALS

(75) Inventor: Satoshi Machida, Chiba (JP)

(73) Assignee: Seiko Instruments Inc. (JP)

( * ) Notice: Subject to any disclaimer, the term of this patent is extended or adjusted under 35 U.S.C. 154(b) by 822 days.

(21) Appl. No.: 10/245,408

(22) Filed: Sep. 17, 2002

(65) Prior Publication Data

US 2003/0067635 A1 Apr. 10, 2003

(30) Foreign Application Priority Data

Oct. 5, 2001 (JP) .............................. 2001-310086

(51) Int. Cl.
*H04N 1/04* (2006.01)

(52) U.S. Cl. ...................... 358/482; 358/483; 358/445; 358/496; 358/512; 358/513; 358/514; 358/509; 250/208.1

(58) Field of Classification Search ................ 358/483, 358/482, 512–514, 474, 505, 496, 497, 445, 358/473, 472, 475, 509; 250/208.1, 234–236; 382/312, 318, 319; 257/724, E27.13, E27.15, 257/E25.005

See application file for complete search history.

(56) References Cited

U.S. PATENT DOCUMENTS

| 4,999,484 | A | * | 3/1991 | Kaneko | .................... 250/208.1 |
| 5,315,412 | A | * | 5/1994 | Mihara et al. | .............. 358/512 |
| 5,357,351 | A | * | 10/1994 | Nakajima et al. | ........... 358/482 |
| 5,436,737 | A | * | 7/1995 | Nakajima et al. | ........... 358/494 |
| 5,587,814 | A | * | 12/1996 | Mihara et al. | .............. 358/512 |
| 5,619,345 | A | * | 4/1997 | Machida et al. | ............ 358/482 |
| 5,917,621 | A | * | 6/1999 | Yushiya | ...................... 358/518 |
| 6,865,000 | B1 | * | 3/2005 | Yushiya | ...................... 358/518 |

* cited by examiner

*Primary Examiner*—Cheukfan Lee
(74) *Attorney, Agent, or Firm*—Adams & Wilks

(57) ABSTRACT

An image reader is constituted by an image sensor having a plurality of image sensor ICs mounted therein linearly, wherein the plurality of image sensor ICs are divided into a plurality of blocks to read image signals of the blocks in the same period, and adjacent light receiving elements of the adjacent image sensor ICs between the blocks are arranged so as to be spaced from each other in a sub-scanning direction in such a way that the reading areas of the image signals which are to be read in the same period in the sub-scanning direction become identical to each other. Thus, no continuousness of an image is distorted even in a joint between the adjacent blocks.

18 Claims, 5 Drawing Sheets

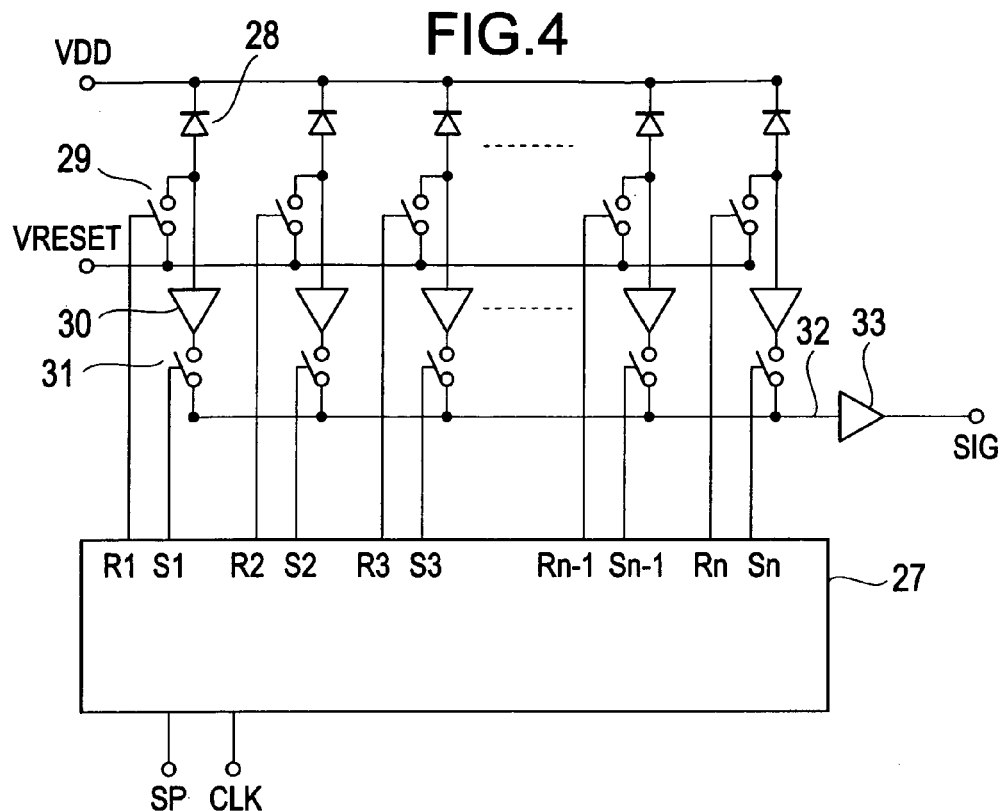
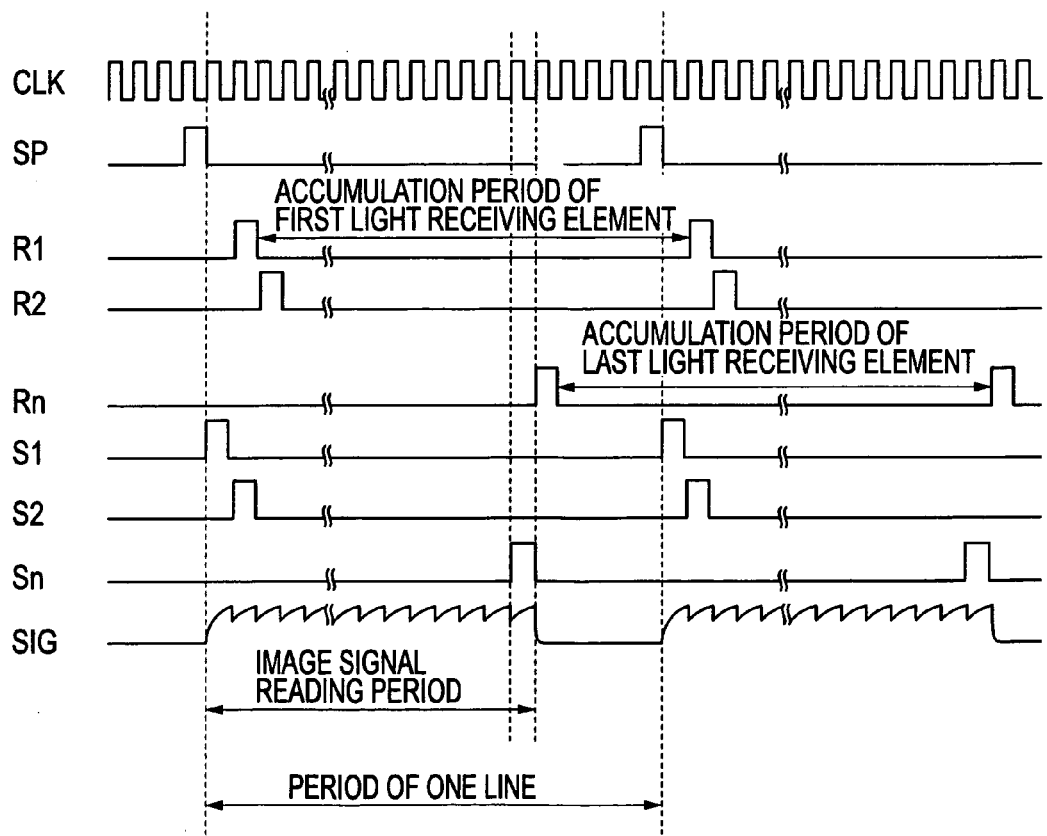

IMAGE READER HAVING IMAGE SENSOR ICS DIVIDED INTO PLURAL BLOCKS HAVING SIMULTANEOUSLY READ-OUT IMAGE SIGNALS

BACKGROUND OF THE INVENTION

1. Field of the Invention

The present invention relates in general to an image reader for reading information on an original to obtain the information in the form of electrical signals. In particular, the invention relates to an image reader for use in copying machines, scanners, and the like for which it is required to read information on an original at high speed.

2. Description of the Related Art

Heretofore, there is known a color image reader including light sources of equal to or larger than three colors, and an image sensor in which a plurality of image sensor ICs are mounted linearly, wherein in order to read image data at high speed, the image sensor ICs are divided into equal to or larger than two blocks to read out image signals of the blocks in the same period. This image sensor is described in JP 09-348339 A. This image sensor described therein will hereinbelow be described.

FIG. 11 shows a plan view of an example of a monochrome image sensor IC for use in a conventional color image reader.

Referring now to FIG. 11, image sensor ICs 1-1 to 1-9 having the same structure are mounted linearly on a substrate 107. Each of the image sensor ICs is provided with a start signal input terminal 103, a start signal output terminal 105, and an image signal output terminal 104, and these image sensor ICs are electrically connected to one another through a wiring pattern 112 distributed on the substrate 107 and bonding wires 106. Each of the image sensor ICs is provided with a light receiving element line 102. While not illustrated in FIG. 11, a clock pulse and a voltage from a power source are supplied to each of the image sensor ICs through the associated one of the bonding wires 106.

The image sensor ICs are divided into three blocks; a first block consisting of the image sensors ICs 1-1, 1-2 and 1-3, a second block consisting of the image sensor ICs 1-4, 1-5 and 1-6, and a third block consisting of the image sensor ICs 1-7, 1-8 and 1-9. The start signal input terminals 103 of the image sensor ICs, of the image sensor ICs of the blocks, which are mounted on the most left-hand side are all connected to a start signal input terminal 108 of the substrate 107. The start signal input terminals 103 of the image sensor ICs, in and after the second chips, of the image sensor ICs of the blocks are respectively connected to the start signal output terminals 105 of the image sensor ICs arranged therebefore by one.

In addition, the substrate 107 has three image signal output terminals, i.e., an image signal output terminal 109, an image signal output terminal 110, and an image signal output terminal 111. The image signal output terminal 109 is connected to the image signal output terminals 104 of the image sensor ICs 1-1, 1-2 and 1-3 through the associated ones of the bonding wires and the substrate wiring pattern. The image signal output terminal 110 is connected to the image signal output terminals 104 of the image sensor ICs 1-4, 1-5 and 1-6 through the associated ones of the bonding wires and the substrate wiring pattern. The image signal output terminal 111 is connected to the image signal output terminals 104 of the image sensor ICs 1-7, 1-8 and 1-9 through the associated ones of the bonding wires and the substrate wiring pattern.

As a result, the image signals of the image sensor ICs of the first, second and third blocks are respectively outputted through the image signal output terminals 109, 110 and 111. In addition, since a start pulse which has been inputted through a start pulse input terminal 108 of the substrate 107 is inputted to a start signal input terminal 3, being mounted on the most left-hand side, of the image sensor ICs of the blocks, the image signals of the blocks starts to be outputted simultaneously, and after completion of the output for three chips of the image sensor ICs, the output of the image signals of the blocks ends simultaneously.

FIG. 12 shows a timing chart useful in explaining an example of the operation of the conventional color image reader using the image sensor shown in FIG. 11.

Referring now to FIG. 12, when upon turning OFF a light source RED, a start pulse is inputted to the image sensor ICs 1-1, 1-4 and 1-7 through the start signal input terminal 108 of the substrate 7, image signals of a RED component start to be outputted from the corresponding light receiving elements of the image sensor ICs in the blocks. For the time required to output these image signals, there is only required the time required for the image sensor ICs of three chips to output the image signals of the RED component. A light source GREEN is turned ON after completion of the output from all of the image sensor ICs, and then all of the light receiving elements accumulate the carriers which have been generated due to the incidence of the reflected light, from an original, of the light emitted from the light source GREEN. When upon turning OFF the light source GREEN, the start pulse is inputted to the image sensor ICs 1-1, 1-4 and 1-7 through the start signal input terminal 108 of the substrate 107, image signals of the GREEN component start to be outputted from the corresponding light receiving elements of the image sensor ICs in the blocks. This is also applied to the BLUE component.

In such a conventional image reader, however, there is encountered the problem that the image is slipped between adjacent blocks as the original moves in the sub-scanning direction. For example, the last light receiving element of the first block is arranged adjacent to the first light receiving element of the second block, and hence a period of time required to accumulate the reflected light from an original differs depending on them. For this reason, the areas in which the adjacent light receiving elements read information on an original are slipped from each other in a sub scanning direction. Consequently, there is encountered the problem that the continuousness of an image is distorted in a joint between blocks in the reproduced image.

The foregoing problem is common to image readers that read image signals from image sensors arranged in a plurality of blocks simultaneously and is also common in image readers for reading monochrome images.

SUMMARY OF THE INVENTION

In the light of the foregoing, the present invention has been made in order to solve the above-mentioned problems associated with the prior art, and it is, therefdore, an object to provide an image reader in which no continuousness of an image is distorted even in a joint between blocks.

In order to achieve the above-mentioned object, according to the present invention, an image reader is constructed as follows.

In an image reader which is constituted by an image sensor having a plurality of image sensor ICs mounted therein linearly, the image reader is characterized in that the plurality of image sensor ICs are divided into a plurality of blocks to read image signals of the blocks in the same period, and adjacent light receiving elements of the adjacent image sensor ICs between the blocks are arranged so as to be spaced from each other in a sub scanning direction in such a way that the reading areas of the image signals which are to be read in the same period in the sub scanning direction become identical to each other.

According to this image reader, since an area in which adjacent light receiving elements between adjacent blocks read information on an original is not slipped in a sub scanning direction, no continuousness of an image is distorted even in a joint between blocks in a reproduced image.

BRIEF DESCRIPTION OF THE DRAWINGS

The above and other objects as well as advantages of the present invention will become clear by the following description of the preferred embodiments of the present invention with reference to the accompanying drawings, wherein:

FIG. 4 is a circuit diagram showing a configuration of a typical circuit of an image sensor IC 1 for use in the image reader according to the present invention;

FIG. 5 is a timing chart useful in explaining the operation of the IC shown in FIG. 4;

DETAILED DESCRIPTION OF THE PREFERRED EMBODIMENTS

The preferred embodiments of the present invention will hereinafter be described in detail with reference to the accompanying drawings.

Figure 1:
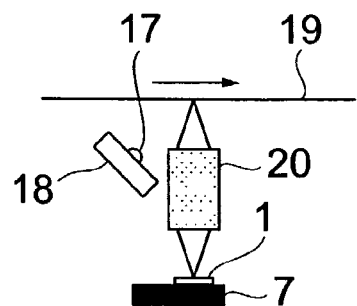
FIG. 1 is a cross sectional view showing the construction of an image reader according to the present invention.

FIG. 1 is a cross sectional view showing the construction of an image reader according to the present invention. Referring now to FIG. 1, the reflected light from an original 19 is made incident through a SELFOC lens array 20 to a light receiving element line of an image sensor IC 1 mounted on a substrate 7. An LED 17 is mounted on the substrate 18, and the original is irradiated with the light emitted from the LED 17. While in this case, an LED is used as the light source, alternatively, a fluorescent tube or the like may also be used as the light source.

Figure 2:
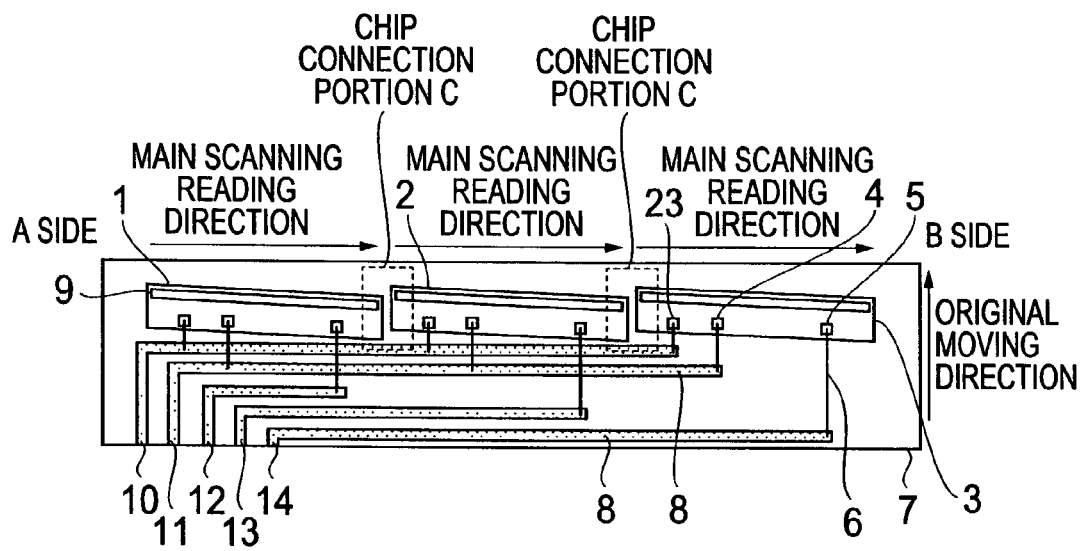
FIG. 2 is a plan view showing the structure of an example of an image sensor for use in the image reader according to the present invention.

FIG. 2 is a plan view showing the structure of an example of an image sensor for use in the image reader according to the present invention.

Referring now to FIG. 2, image sensor ICs 1, 2 and 3 having the same structure are mounted linearly on a substrate 7. Each of the image sensor ICs is provided with a start signal input terminal 23, a clock signal input terminal 4, and an image signal output terminal 5, and these image sensor ICs are electrically connected to one another through a wiring pattern 8 distributed on the substrate 7 and bonding wires 6. Each of the image sensor ICs is provided with a light receiving element line 9. While not illustrated in FIG. 2, a voltage from a power source is supplied to each of the image sensor ICs through the associated one of the bonding wires 6.

The image sensor ICs are divided into three blocks; a first block consisting of the image sensors IC 1, a second block consisting of the image sensor IC 2, and a third block consisting of the image sensor IC 3. The image sensors ICs 1, 2 and 3 may have the same structure. The start signal and the clock signal of ICs are respectively connected to the start signal input terminals 10 and the clock signal input terminal 11 of the substrate 7.

In addition, the substrate 7 has three image signal output terminals, i.e., an image signal output terminal 12, an image signal output terminal 13, and an image signal output terminal 14. The image signal output terminal 12 is connected to the image signal output terminals 5 of the image sensor IC 1 through the associated ones of the bonding wires and the substrate wiring pattern. The image signal output terminal 13 is connected to the image signal output terminals 5 of the image sensor IC 2 through the associated ones of the bonding wires and the substrate wiring pattern. The image signal output terminal 14 is connected to the image signal output terminals 5 of the image sensor IC 3 through the associated ones of the bonding wires and the substrate wiring pattern.

As a result, the image signals of the image sensor ICs of the first, second and third blocks are respectively outputted through the image signal output terminals 12, 13 and 14. In addition, since a start pulse which has been inputted through a start pulse input terminal 10 of the substrate 7 is inputted to a start signal input terminal 23 of the image sensor ICs of the blocks, the image signals of the blocks starts to be outputted simultaneously, and after completion of the output for one chip of the image sensor ICs, the output of the image signals of the blocks ends simultaneously. As shown in FIG. 2, all of chip connection portions C of all of the adjacent image sensor ICs are arranged so as to be slipped in an original moving direction. Then, it is assumed that a quantity of slippage is made the same among all of the adjacent portions.

Figure 3:
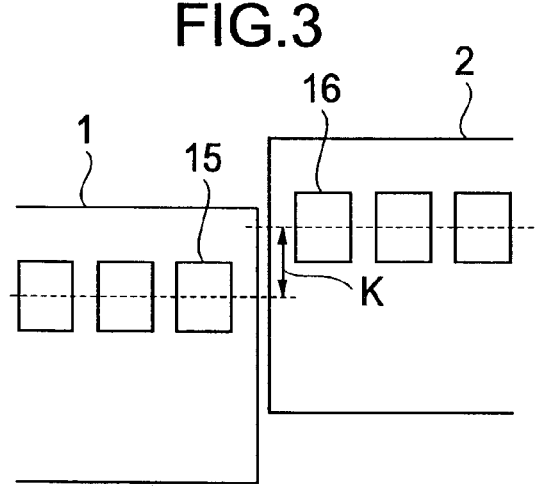
FIG. 3 is an enlarged view showing the structure of a chip connection portion C.

FIG. 3 is an enlarged view showing the structure of the chip connection portion C. A light receiving element 15 of the image sensor IC 1, from which an image signal should be finally read out, is slipped from a light receiving element 16 of the image sensor IC 2, from which an image signal should be firstly read, by K in an original moving direction. The method of setting a value of K will be described later.

FIG. 4 is a circuit diagram showing a configuration of a typical circuit of an image sensor IC 1 for use in the image reader according to the present invention. A start signal SP and a clock signal CLK are both inputted to a control circuit 27 constituted by a shift register and the like through a start signal input terminal 23 and a clock signal input terminal 4. Light receiving elements 28 constituted by photodiodes or the like are each adapted to be fixed at a reset electric potential VRESET by reset switches 29, respectively. An output signal of the photodiodes is input to an amplifier 30 constituted by a source-follower amplifier and the like. An output signal of the amplifier 30 is read out to a common signal line 32 through a read switch 31. The signal on the common signal line 32 is inputted to an input amplifier 33, and then an output signal of the output amplifier 33 is read out to the outside through an image signal output terminal 5. Output signals of the light receiving elements 28 are successively outputted, and thereafter, the carriers generated through the photoelectric conversion start to be successively accumulated. This point will now be described with reference to FIG. 5.

FIG. 5 is a timing chart useful in explaining an example of the operation of the ICs shown in FIG. 4. Upon inputting the start signal SP, an output signal of the first light receiving element is read out by the operation of a pulse S1. Next, an output signal of the second light receiving element is read out by the operation of a pulse S2, and at the same time, the first light receiving element is reset by a pulse R1. Thereafter, the same operation is repeatedly carried out, and thus the operation for reading out the output signals of the n light receiving elements and the operation for resetting the light receiving elements are successively repeated. At the time when the level of the reset pulse has become low, the light receiving element becomes the accumulation state to accumulate the electric charges generated due to the incidence of the reflected light from an original. Since the position of the reset pulse changes depending on the position of the light receiving element, the accumulation period differs depending on the light receiving elements in output for one line.

Figure 7:
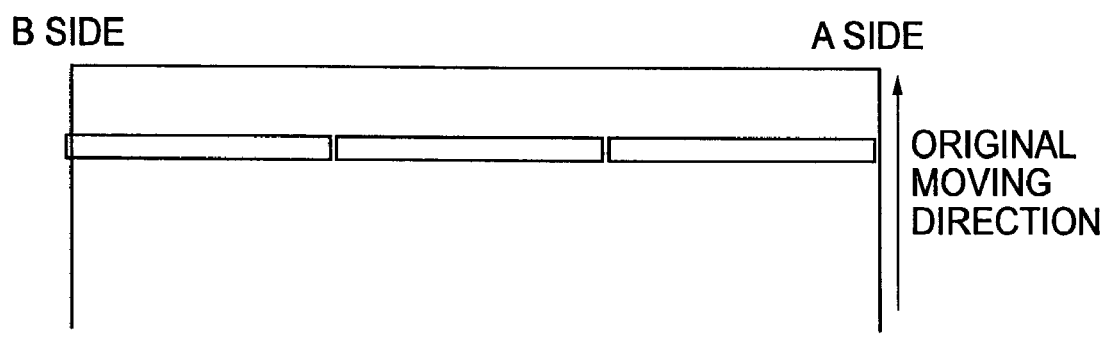
FIG. 7 is a diagram showing an image reading area for one line in an image reader according to the present invention.

In a conventional image reader, the value of K shown in FIG. 3 is zero. Then, if an original is moved at constant speed, then an image reading area for one line becomes as shown in FIG. 7. FIG. 7 shows an image reading area for one line in a conventional image reader. The reason that the slippage is observed is that since the accumulation period for one line of the first light receiving element is deviated from the accumulation period for one line of the last light receiving element in each of the image sensor ICs, the area in which information on an original is read from the first light receiving element is slipped from the area in which information on an original is read from the last light receiving element in a horizontal direction.

Figure 6:
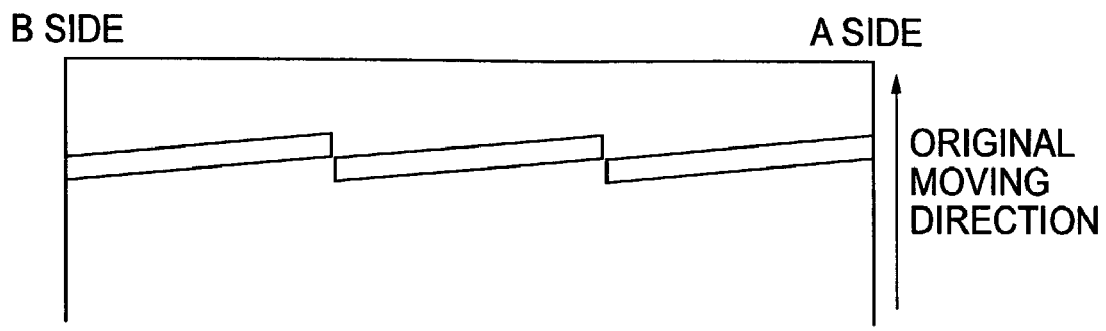
FIG. 6 is a diagram showing an image reading area for one line in a conventional image reader.

In light of the foregoing, in the present invention, image sensor ICs are arranged with light receiving elements in each of chip connection portions being slipped from each other in such a way as to compensate for the stepped portion between the adjacent image reading areas in each of the chip connection portions shown in FIG. 7. If a value of K shown in FIG. 3, for example, is set to about a width of the sub scanning direction of the light receiving element 15, then the image reading areas for one line of the image sensor become as shown in FIG. 6. FIG. 6 shows image reading areas for one line of the image reader according to the present invention.

We urge that the value of K is decided in terms of accuracy as follows. When an original is moved at constant speed, the image reading width for one line is moved for a period of one line shown in FIG. 5. For a period of time ranging from start time of the accumulation period of the first light receiving element up to start time of the accumulation period of the last light receiving element, an original is moved by the following length. If this length is made the value of K, then it is possible to supplement the difference in time by the difference in spatial position.

$K$=(pitch for one line in sub scanning direction)×
(start time of accumulation period of first light receiving element−start time of accumulation period of last light receiving element)/(period of one line)    (1)

The period of one line is normally equal to the original moving period for one line.

As apparent from FIG. 5, since the difference between the start time of the accumulation period of the first light receiving element and the start time of the accumulation period of the last light receiving element is roughly equal to the image signal reading period, Expression (1) can be approximated with the following Expression (2).

$K$≡(pitch for one line in sub scanning direction)×
(image signal reading period for one line)/
(original moving period for one line)    (2)

Here, if the image signal reading period for one line is roughly equal to the original moving period for one line, then the value of K may be set to about a pitch for one line. While since there is the problem in the mounting accuracy as well, it is difficult to accurately set the value of K to the pitch for one line. If the value of K is set in such a way as to meet the following Expression, then the gap in the joint between the chips in the reproduced image can be suppressed to about ½ line.

(pitch for one line in sub scanning direction)×
0.5≦$K$≦(pitch for one line in sub scanning direction)×1.5    (3)

In addition, the pitch for one line is near a width of the light receiving element in the sub scanning direction in many cases. In such cases, the value of K may be set in such a way as to meet the following Expression.

(width of light receiving element in sub scanning direction)×0.5≦$K$≦(width of light receiving element in sub scanning direction)×1.5    (4)

Figure 8:
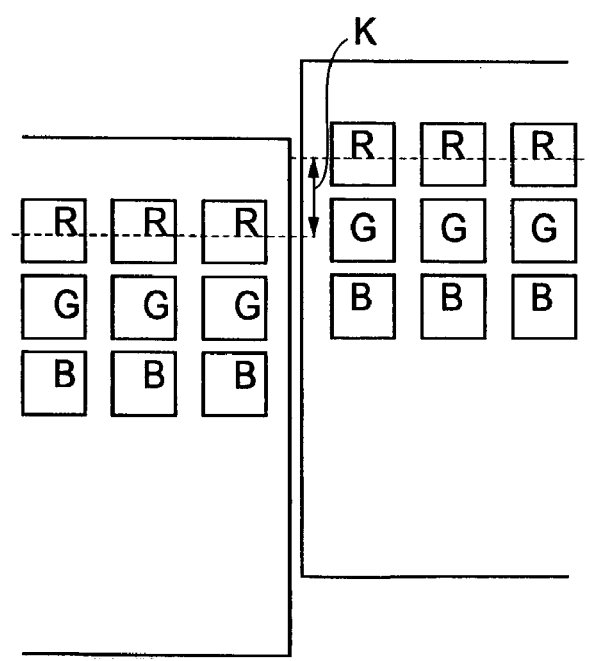
FIG. 8 is an enlarged view showing the structure of a chip connection portion C of an image reader of another embodiment according to the present invention.

In the case of the image sensor IC which uses a color filter and which has the light receiving elements of the three primary colors, i.e., R, G and B in the sub scanning direction, wherein the light receiving elements for one color are arranged in the width of one line in the sub scanning direction, as shown in FIG. 8, the value of K is set to about a pitch for one line in the sub scanning direction. FIG. 8 is an enlarged view showing the structure of a chip connection portion of an image reader of another embodiment according to the present invention.

Figure 9:
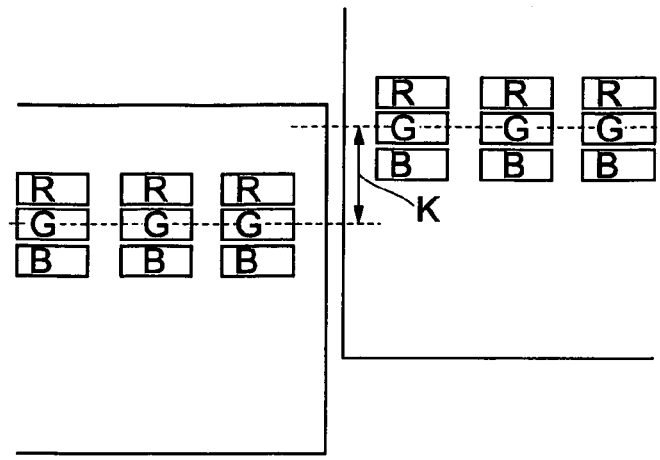
FIG. 9 is an enlarged view showing the structure of a chip connection portion C of an image reader of still another embodiment according to the present invention.

In addition, in the case as well of the image sensor IC which uses a color filter and which has the light receiving elements of the three primary colors, i.e., R, G and B in the sub scanning direction, wherein the light receiving elements for the three primary colors are arranged in the width of one line in the sub scanning direction, as shown in FIG. 9, the value of K is set to about a pitch for one line in the sub scanning direction. FIG. 9 is an enlarged view showing the structure of a chip connection portion of an image reader of still another embodiment according to the present invention.

Figure 10:
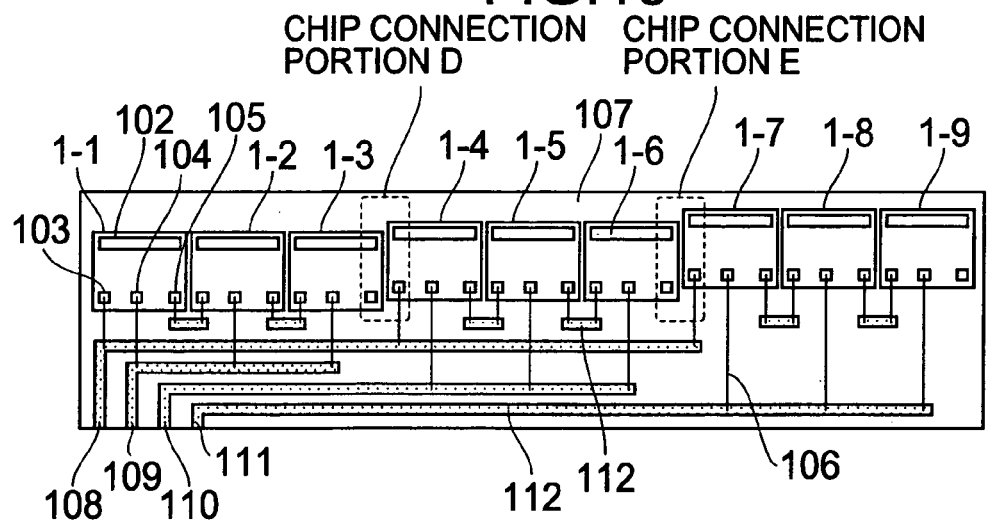
FIG. 10 is a plan view showing the structure of an example of an image sensor for use in the image reader of another embodiment according to the present invention.
Figure 11:
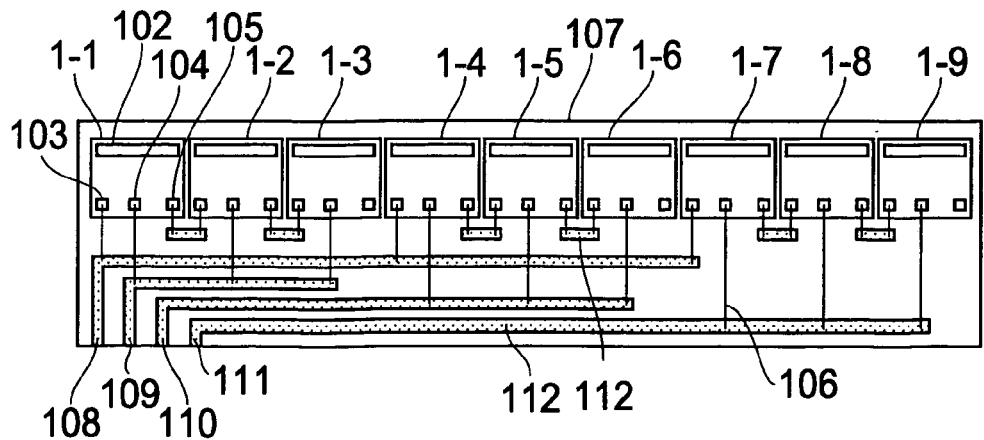
FIG. 11 is a plan view showing the structure of an example of an image sensor for monochrome for use in a conventional color image reader.
Figure 12:
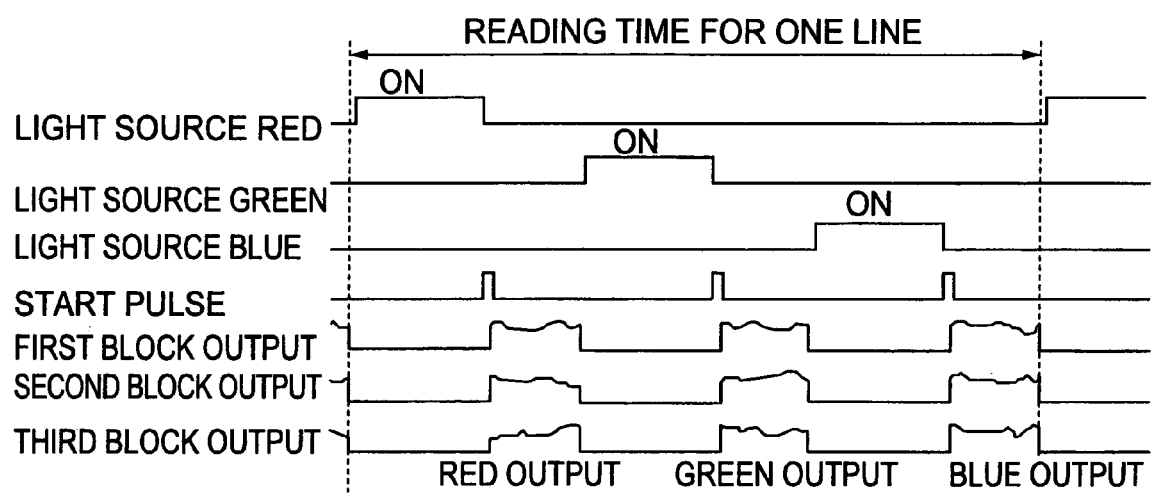
FIG. 12 is a timing chart useful in explaining an example of the operation of the conventional color image reader.

FIG. 10 is a plan view showing the structure of an example of an image sensor for use in the image reader of another embodiment according to the present invention. In the case of the structure in which the three chips are made one block as shown in FIG. 11, as shown in FIG. 10, a gap may be provided in each of a chip connection portion D and a chip connection portion E each as a joint between the adjacent blocks. Adoption of this structure results from that since the output signals of the three chips within one block are outputted in a serial manner, those three chips can be regarded as one chip. Furthermore, in the case where as shown in FIG. 12 of the prior art, the output signal for one line is read three times by switching the light sources of the three primary colors, Expression (2) by which the gap K between the last light receiving element in one block and the first light receiving element in a next block in a joint between these blocks is obtained needs to be changed as follows:

$$K \equiv \text{(pitch for one line in sub scanning direction)} \times \text{(image signal reading period for one color)} / \text{(original moving period for one line)} \quad (5)$$

This reason is that an original is moved for one line while reading out the output signal three times, and hence the value of K becomes about 1/6 to about 1/3 of that in the case of one color.

As set forth hereinabove, according to the present invention, it is possible to provide an image reader which is constituted by an image sensor in which a plurality of image sensor ICs are divided into a plurality blocks and image signals of the blocks are read in the same period, wherein no continuousness of an image is distorted even in a joint between the blocks with simple structure.

While the present invention has been particularly shown and described with reference to the preferred embodiments, it will be understood that the various changes and modifications will occur to those skilled in the art without departing from the scope and true spirit of the invention. The scope of the invention is, therefore, to be determined solely by the appended claims.

What is claimed is:

1. An image reading device comprising: a support member; and a plurality of image sensor ICs mounted on the support member each having a plurality of light receiving elements arranged along a main scanning direction for receiving light reflected by an object to be read and outputting an image output signal while the object is being moved across the image sensor ICs in a sub-scanning direction, the image sensor ICs being divided into a plurality of blocks such that image signal outputs of each block are read during the same time period, and the image sensor ICs being arranged along the main scanning direction such that adjacent light receiving elements of adjacent image sensor ICs between the blocks are spaced from each other in the sub-scanning direction so that areas of the object which are to be read during the same time period in the sub-scanning direction are the same as each other; wherein adjacent light receiving elements of adjacent image sensor ICs between the blocks are spaced from each other in the sub-scanning direction by an amount K determined according to the following expression:

K=(pitch of one line of movement of the object in the sub-scanning direction)×(start time of accumulation period of charge in a first one of the light receiving elements−start time of accumulation period of charge in a last one of the light receiving elements)/(period of one line movement of the object in the sub-scanning direction); and wherein the value of K is set in the range of:

(pitch of one line movement of the object in the sub-scanning direction)×0.5≦K≦(pitch of one line movement of the object in the sub-scanning direction)×1.5.

2. An image reading device according to claim 1; wherein image signal outputs of all of the blocks are read out simultaneously.

3. An image reading device according to claim 1; further comprising one or more light sources for emitting light onto the object.

4. An image reading device according to claim 3; wherein the one or more light sources comprise three light sources each for emitting light of a different color at different times from each other.

5. An image reading device according to claim 4; wherein the three light sources comprise one or more LEDs for emitting light of three colors.

6. An image reading device according to claim 4; wherein image signal outputs of all of the blocks are read out simultaneously while all of the light sources are turned OFF.

7. An image reading device according to claim 1; wherein the plurality of light receiving elements of the image sensor ICs successively output data obtained by photo-electric conversion.

8. An image reading device according to claim 1; further comprising a lens for focusing light reflected by the object toward the image sensor ICs.

9. An image reading device comprising: a support member; and a plurality of image sensor ICs mounted on the support member each having a plurality of light receiving elements arranged along a main scanning direction for receiving light reflected by an object to be read and outputting an image output signal while the object is being moved across the image sensor ICs in a sub-scanning direction, the image sensor ICs being divided into a plurality of blocks such that image signal outputs of each block are read during the same time period, and the image sensor ICs being arranged along the main scanning direction such that adjacent light receiving elements of adjacent image sensor ICs between the blocks are spaced from each other in the sub-scanning direction so that areas of the object which are to be read during the same time period in the sub-scanning direction are the same as each other; wherein adjacent light receiving elements of adjacent image sensor ICs between the blocks are spaced from each other in the sub-scanning direction by an amount K determined according to the following expression:

K=(pitch of one line of movement of the object in the sub-scanning direction)×(start time of accumulation period of charge in a first one of the light receiving elements−start time of accumulation period of charge in a last one of the light receiving elements)/(period of one line movement of the object in the sub-scanning direction); and wherein the value of K is set in the range of:

(width of a respective light receiving element in the sub-scanning direction)×0.5≦K≦(width of a respective light receiving element in the sub-scanning direction)×1.5.

10. An image reading device according to claim 9; wherein image signal outputs of all of the blocks are read out simultaneously.

11. An image reading device according to claim 9; further comprising one or more light sources for emitting light onto the object.

12. An image reading device according to claim 11; wherein the one or more light sources comprise three light sources each for emitting light of a different color at different times from each other.

13. An image reading device according to claim 12; wherein the three light sources comprise one or more LEDs for emitting light of three colors.

14. An image reading device according to claim 12; wherein image signal outputs of all of the blocks are read out simultaneously while all of the light sources are turned OFF.

15. An image reading device according to claim 9; wherein the plurality of light receiving elements of the image sensor ICs successively output data obtained by photo-electric conversion.

16. An image reading device according to claim 9; further comprising a lens for focusing light reflected by the object toward the image sensor ICs.

17. An image reading device comprising: a support member; and a plurality of image sensor ICs mounted on the support member each having a plurality of light receiving elements arranged along a main scanning direction for receiving light reflected by an object to be read and outputting an image output signal while the object is being moved across the image sensor ICs in a sub-scanning direction, the image sensor ICs being divided into a plurality of blocks such that image signal outputs of each block are read during the same time period, and the image sensor ICs being arranged along the main scanning direction such that adjacent light receiving elements of adjacent image sensor ICs between the blocks are spaced from each other in the sub-scanning direction so that areas of the object which are to be read during the same time period in the sub-scanning direction are the same as each other; wherein each of the image sensor ICs has an image signal output terminal for outputting an image signal, a start pulse input terminal to which a start pulse is supplied to control the outputting of the image signal from the image signal output terminal, and a start pulse output terminal for outputting the start pulse; and wherein a start pulse output terminal of an anterior stage image sensor IC is connected to a start pulse input terminal of a posterior stage image sensor IC in each of the blocks, and start pulse input terminals of initial stage image sensor ICs in the respective blocks are connected together so that image signals are simultaneously output from all blocks.

18. An image reading device comprising: a support member; and a plurality of image sensor ICs mounted on the support member each having a plurality of light receiving elements arranged along a main scanning direction for receiving light reflected by an object to be read and outputting an image output signal while the object is being moved across the image sensor ICs in a sub-scanning direction, the image sensor ICs being divided into a plurality of blocks such that image signal outputs of each block are read during the same time period, and the image sensor ICs being arranged along the main scanning direction such that adjacent light receiving elements of adjacent image sensor ICs between the blocks are spaced from each other in the sub-scanning direction so that areas of the object which are to be read during the same time period in the sub-scanning direction are the same as each other; wherein a start signal is input to one of the image sensor ICs in each of the respective blocks, and the one image sensor IC supplies a start signal to the other image sensor ICs of the respective blocks.

* * * * *